US006537600B1

United States Patent
Meldrum

(10) Patent No.: US 6,537,600 B1
(45) Date of Patent: Mar. 25, 2003

(54) MULTIPLE-STAGE ENERGY-EFFICIENT PRODUCE PROCESSING SYSTEM

(76) Inventor: Charles R. Meldrum, 125 Kenwood, Rd., Grosse Pointe Farms, MI (US) 48236

( * ) Notice: Subject to any disclaimer, the term of this patent is extended or adjusted under 35 U.S.C. 154(b) by 0 days.

(21) Appl. No.: 09/661,493

(22) Filed: Sep. 14, 2000

Related U.S. Application Data

(60) Provisional application No. 60/153,832, filed on Sep. 14, 1999, and provisional application No. 60/153,908, filed on Sep. 14, 1999.

(51) Int. Cl.[7] ............................ A23L 3/00; C02F 1/00
(52) U.S. Cl. .................. 426/102; 426/242; 426/244; 426/248; 426/286; 426/521; 426/134; 426/19; 426/25.3; 426/34; 426/37; 426/42; 426/15; 426/3.1
(58) Field of Search .................. 426/102, 238, 426/244, 248, 286, 615, 385, 506, 520, 524, 242, 521; 134/1, 19, 25.3, 34, 37, 42; 15/3.1

(56) References Cited

U.S. PATENT DOCUMENTS

| 592,735 A | 10/1897 | Jones |
| 3,450,544 A | 6/1969 | Badran et al. |
| 3,699,976 A | 10/1972 | Abe et al. |
| 3,753,886 A | 8/1973 | Myers |
| 3,849,195 A | 11/1974 | Powell, Jr. et al. |
| 3,945,170 A | 3/1976 | Brown |
| 3,974,355 A | 8/1976 | Bach ..................... 219/10.81 |
| 4,091,119 A | 5/1978 | Bach |
| 4,178,188 A | 12/1979 | Dussault et al. |
| 4,224,347 A | 9/1980 | Woodruff |
| 4,409,999 A | 10/1983 | Pedziwiatr |
| 4,457,221 A | * 7/1984 | Geren ..................... 99/451 |
| 4,524,079 A | 6/1985 | Hofmann |

(List continued on next page.)

FOREIGN PATENT DOCUMENTS

JP        401086829 A   * 3/1989

*Primary Examiner*—Keith Hendricks
*Assistant Examiner*—Drew Becker
(74) *Attorney, Agent, or Firm*—Cantor Colburn LLP

(57) ABSTRACT

Mobile systems for cleaning and drying produce in order to extend shelf life, are described. Produce cleaning systems (20) are provided that employ plural forms of energy in an ionic liquid-based washing system (22, 24, 26) containing solvents and solutes which promote the conduction of electrical energy. The electrical energy can be applied to the produce in the wash bath (24) in various waveforms, such as a modulating wave superimposed on a carrier wave. Additionally, ultrasonic energy is employed to provide high-frequency mechanical pressure waves against the produce. The electrical energy and the mechanical energy combine to produce energy in the applicable resonant frequency range that acts to destroy or transform pathogens, dirt and synthetic molecules that may exist on the item of produce (190). Systems for drying the item of produce (190), after it has been immersed in a natural soluteladen slurry maintained at a temperature below the freezing point of water, are also provided. The drying process is rapidly and effectively accelerated in order to fully crystallize a layer of solute-laden slurry that has been applied on the external surface of an item of produce (190).

58 Claims, 7 Drawing Sheets

U.S. PATENT DOCUMENTS

| | | | |
|---|---|---|---|
| 4,622,229 A | 11/1986 | Toshitsugu | |
| 4,665,898 A | 5/1987 | Costa et al. | |
| 4,672,984 A | 6/1987 | Ohhashi | |
| 4,695,472 A | 9/1987 | Dunn et al. | |
| 4,711,789 A | 12/1987 | Orr et al. | |
| 4,814,190 A | 3/1989 | Ismail | 426/102 |
| 4,838,154 A | 6/1989 | Dunn et al. | |
| 4,847,145 A | 7/1989 | Matsui | |
| 4,865,060 A | 9/1989 | Shibano | |
| 4,875,407 A | 10/1989 | Inagaki | |
| 4,883,674 A | 11/1989 | Fan | |
| 4,893,320 A | 1/1990 | Yanagi et al. | |
| 4,895,729 A | 1/1990 | Powrie et al. | |
| 4,907,611 A | 3/1990 | Shibano | |
| 4,943,440 A | 7/1990 | Armstrong | |
| 4,946,694 A | 8/1990 | Gunnerson et al. | 426/273 |
| 4,959,230 A | 9/1990 | Wyss et al. | |
| 4,961,943 A | 10/1990 | Blanthorn et al. | |
| 4,984,597 A | 1/1991 | McConnell et al. | |
| 4,996,062 A | 2/1991 | Lehtonen et al. | |
| 5,026,564 A | 6/1991 | Hayden | |
| 5,048,404 A | 9/1991 | Bushnell et al. | |
| 5,049,400 A | 9/1991 | Hayden | |
| 5,091,152 A | 2/1992 | Thomas, Sr. | |
| 5,097,755 A | 3/1992 | Hill | |
| 5,113,881 A | 5/1992 | Lin et al. | |
| 5,139,684 A | 8/1992 | Kaali et al. | |
| 5,188,738 A | 2/1993 | Kaali et al. | |
| 5,229,152 A | 7/1993 | Meldrum | |
| 5,235,905 A | 8/1993 | Bushnell et al. | |
| 5,244,684 A | 9/1993 | Tong et al. | |
| 5,250,160 A | 10/1993 | Oksman et al. | |
| 5,269,216 A | 12/1993 | Corominas | |
| 5,282,940 A | 2/1994 | Griffis et al. | |
| 5,285,548 A | 2/1994 | Moll | |
| 5,288,459 A | 2/1994 | Lawrence | |
| 5,290,580 A | 3/1994 | Floyd et al. | |
| 5,290,583 A | 3/1994 | Reznik et al. | |
| 5,316,778 A | 5/1994 | Hougham | |
| 5,326,530 A | 7/1994 | Bridges | |
| 5,328,451 A | 7/1994 | Davis et al. | |
| 5,334,619 A | 8/1994 | Vaughn et al. | |
| 5,364,648 A | 11/1994 | Meldrum | |
| 5,374,437 A | 12/1994 | Largares Corominas | |
| 5,378,287 A | 1/1995 | Pedziwiatr | |
| 5,405,631 A | 4/1995 | Rosenthal | |
| 5,415,882 A | 5/1995 | Knipper et al. | |
| 5,433,142 A | 7/1995 | Roth | |
| 5,447,733 A | 9/1995 | Bushnell et al. | |
| 5,465,655 A | 11/1995 | Papetti | |
| 5,472,720 A | 12/1995 | Rakhimov et al. | 426/241 |
| 5,498,431 A | 3/1996 | Lindner | |
| 5,531,157 A | 7/1996 | Probst | |
| 5,533,441 A | 7/1996 | Reznik et al. | |
| 5,537,916 A | 7/1996 | Lagares-Corominas | |
| 5,547,693 A | 8/1996 | Krochta et al. | |
| 5,549,041 A | 8/1996 | Zhang et al. | |
| 5,562,114 A | 10/1996 | St. Martin | |
| 5,565,230 A | 10/1996 | Bailey | |
| 5,588,357 A | 12/1996 | Tomikawa et al. | |
| 5,607,613 A | 3/1997 | Reznik | |
| 5,609,900 A | 3/1997 | Reznik | |
| 5,656,095 A | 8/1997 | Honda et al. | |
| 5,662,031 A | 9/1997 | Qin et al. | |
| 5,670,198 A | 9/1997 | Reznik et al. | |
| 5,690,978 A | 11/1997 | Yin et al. | |
| 5,697,291 A | 12/1997 | Burgener et al. | |
| 5,741,539 A | 4/1998 | Knipper et al. | |
| 5,768,472 A | 6/1998 | Reznik | |
| 5,771,336 A | 6/1998 | Polny, Jr. | |
| 5,776,529 A | 7/1998 | Qin et al. | |
| 5,820,694 A | 10/1998 | St. Martin | |
| 5,824,274 A | 10/1998 | Long | |
| 5,825,036 A | 10/1998 | Ishikawa | |
| 5,834,871 A | 11/1998 | Puskas | |
| 5,837,303 A | 11/1998 | Hayden | |
| 5,858,430 A | 1/1999 | Endico | |
| 5,858,435 A | 1/1999 | Gallo | |
| 5,862,821 A | 1/1999 | Rodriguez | |
| 5,879,732 A | 3/1999 | Caracciolo, Jr. et al. | 426/231 |

* cited by examiner

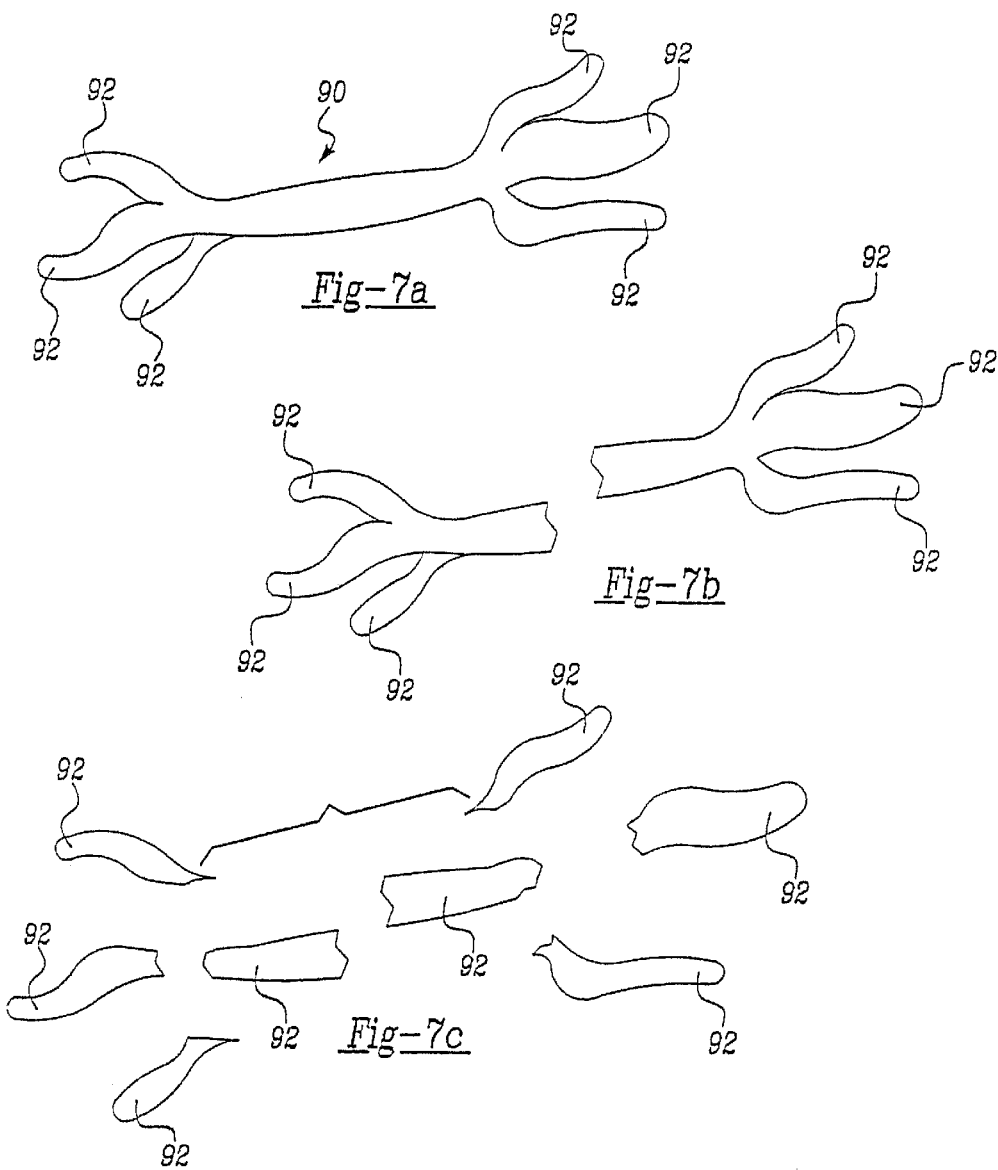
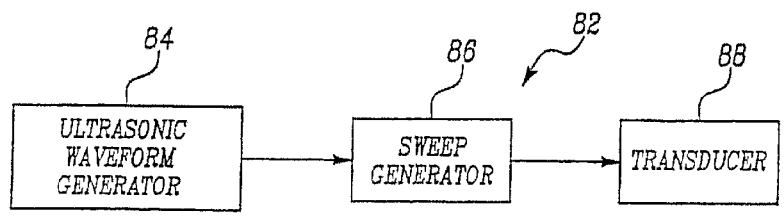

MULTIPLE-STAGE ENERGY-EFFICIENT PRODUCE PROCESSING SYSTEM

CROSS-REFERENCE TO RELATED APPLICATIONS

The instant application claims priority to U.S. Provisional Patent Application Serial No. 60/153,832, filed Sep. 14, 1999, and U.S. Provisional Patent Application Serial No. 60/153,908, filed Sep. 14, 1999, the entire specifications of which are expressly incorporated herein by reference.

FIELD OF THE INVENTION

The present invention relates generally to produce processing systems, and more particularly to mobile, multiple-stage, energy-efficient produce processing systems for extending the shelf life of produce.

BACKGROUND OF THE INVENTION

The freshness of fruits and vegetables, generally referred to as produce, is typically defined by the qualities of taste, texture and appearance. Due to certain physiological effects, produce generally begins to deteriorate and lose its freshness at the time of harvest. Once severed from the parent plant, produce no longer has the natural life-sustaining nutrients and fluids and the immune-like system of the plant to combat bacteria, fungi, viruses, and other pathogens which eventually deteriorate the produce. A significant percentage of most produce harvested for shipment and consumption at distant locations are thus lost due to such deterioration. Because of the immense size of the produce industry, it would be highly advantageous from an economic standpoint to preserve recently harvested produce in its fresh, savory condition for an extended period of time. Others have long recognized this. Hence, many different methods for extending produce shelf life have been developed.

Refrigeration has been the most popular method of increasing the useful life of fresh produce. By storing produce at a suitably low temperature, it is possible to extend the freshness by retarding ripening, softening, textural changes and color changes. Lower temperatures also reduce undesirable metabolic changes and moisture losses, and help prevent or slow undesirable growth on the produce. However, depending on the length of time the produce is chilled, refrigeration generally adversely affects taste and quality. Not all produce can be successfully refrigerated to low temperatures. Excessive or extreme chilling, particularly at freezing or near freezing temperatures, can actually damage most types of produce. Even moderate chilling will interfere with the ripening processes of certain types of produce, such as bananas.

Other methods of extending produce shelf life include coating the produce with a protective material, such as wax. However, the success of the coating is related not only to how well the coating protects the produce, but also how well it maintains a desirable appearance of the produce, without affecting its taste. Consequently, the success of this method has been limited. It has also been attempted to lengthen the shelf life of produce through heating to reduce the micro-organism population, then refrigerating it at a desirable temperature. The success of this process has been limited in that shelf life has not been significantly increased. It has also been a common practice to harvest produce prior to ripening, then treating it with a ripening agent, such as ethylene gas, to effect ripening. This process has generally provided a low quality, unflavorful product, particularly in the case of tomatoes. Furthermore, the deterioration process begins at the time of harvest regardless of ripeness of the produce.

A more recent approach to extending the shelf life of produce, and tomatoes in particular, has been the employment of genetic engineering techniques to decrease the rate in which tomatoes are affected by microorganisms. Such a process can be viewed as overly complicated to accomplish the goals of extended freshness, and has also enjoyed only limited success. Additionally, certain countries prohibit or strictly regulate the growth, sale, and distribution of genetically altered or modified produce, thus cutting off potential markets to produce growers and distributors.

Once approach to extending the shelf life of produce involves the cleaning of produce to remove pathogens, including fungi, bacteria and viral forms. After harvest, the exterior surface of produce is generally contaminated with fungicides and herbicides as a result of the growing process. Also, environmental pollutants, including various halogenated long-chain hydrocarbons and other synthetic chemical compounds, some of which are known to cause cancer in sufficiently concentrated forms, can sometimes be found on produce being shipped to the United States from foreign sources. Domestically grown produce, while sometimes better in terms of the overall level of contaminants, is still not free from synthetically produced chemicals resulting from herbicide and pesticide applications, from transportation and packaging, and from standard practices in the industry. Thus, it is desirable to have a washing system which provides cleaning of these undesirable pathogens, synthetic chemicals and non-naturally occurring substances from the produce prior to final shipment and sale to consumers.

Many produce cleaning procedures currently used in the industry only involve washing the produce in a water-based bath, or the like, to remove undesirable contaminants existing on the produce. Washing produce in water is limited in its ability to remove many pathogens and other contaminants, however. Therefore, more significant produce cleaning procedures have been proposed in the art.

Another approach to extending produce shelf life is described in U.S. Pat. Nos. 5,229,152 (the '152 patent) and 5,364,648 (the '648 patent) issued to Meldrum, the entire specifications of which are expressly incorporated herein by reference. The '152 and '648 patents describe a method and apparatus for increasing the shelf life of produce by carefully cleaning the produce and then employing a "snap freezing" procedure on the cleaned produce. By "snap freezing" it is meant subjecting the produce to temperatures substantially at or below the freezing point of water for a very brief predetermined period of time without the produce flesh being frozen. The method described in the '152 and '648 patents include the step of first introducing an item of produce into a heated bath being vibrated generally at a frequency within the range of subsonic to ultrasonic frequencies for a predetermined time preferably shortly after harvest. The combination of the elevated temperature and mechanical vibration makes active and exposes the different micro-organisms which may exist on the produce. Although the process of vibrating the wash bath at ultrasonic frequencies has been successful in removing pathogens and other contaminants from the produce, this produce washing process can be improved upon to further clean the produce and make it safer for human consumption.

Next, the item of produce is transferred to a nucleation vat containing a natural slurry generally comprising natural material extracts including predetermined concentrations and combinations of byproducts from the fruit or vegetable being processed, low solute concentrations of sucrose sugars, fruit and/or acetic acids, and a water solvent carrier. The slurry is maintained at a temperature below the freezing point of water in order to snap freeze the item of produce. The item of produce is then "snap frozen" by immersing it in the cold slurry for a brief predetermined period of time. Because the item of produce is held in the nucleation vat for only a brief period of time, the flesh of the item of produce itself will not actually be frozen. Finally, the item of produce is transferred from the nucleation vat to an incubation chamber and held there for a predetermined time, generally at ambient temperatures. This incubation, or drying, stage is used to stabilize and dry the item of produce in order to fully crystallize a film of the slurry on the outer surface of the item of produce. This dried film substantially protects the produce from external pathogens, such as bacteria and fungi. The incubation stage generally takes from several minutes to several hours, and even as long as 48 hours. The item of produce can then be stored or displayed for extended periods of time without significant deterioration or loss of taste, texture and appearance, or the need for refrigeration.

The methodology disclosed in the '152 and '648 patents has significantly increased the shelf life of produce as compared to previous conventional methods. However, with respect to the cleaning step, i.e., vibrating the bath at ultrasonic frequencies in order to remove pathogens and other contaminants from the produce, this step can be improved upon to further clean the produce and make it even safer for human consumption. Furthermore, with respect to the drying step, an incubation period of even several minutes per item of produce is generally not preferred by produce growers, processors, and distributors from an efficiency standpoint. This is due, in part, to the advent of highly rapid and mechanized produce processing operations, with the resultant increase in production volume requirements and decrease in the amount of time that produce can economically stay in storage.

Additionally, it is generally necessary to transport the produce, after it has been harvested, to a processing center in order to properly clean and dry the treated produce in accordance with the general teachings of the '152 and '648 patents. This need for transportation, and the related need for truckers, loaders, handlers, and other personnel, adds significantly to the operating costs of the produce industry. Additionally, delays in transporting the produce to the processing plant provides an opportunity for pathogens to attack the produce, leading to losses due to rotten or diseased produce that must be discarded.

Therefore, there exists a need for a system capable of rapidly and effectively cleaning the produce and accelerating the drying process in order to crystallize a solute-laden slurry applied to the outer surface of the produce, so that the produce can be adequately protected against pathogens and be made ready for quicker packaging and distribution. This system must be able to clean and dry the treated produce as soon as possible after it has been harvested. Ideally, the system would be mobile, and thus would be able to be positioned in close proximity to area being harvested so that the produce could be immediately processed and treated.

Therefore, It is an object of the present invention to provide a new and improved system of extending the shelf life of produce.

It is another an object of the present invention to create a higher quality washing system for produce, and a cleaner environment in which to handle produce.

It is another object of the present invention to provide an enhanced cleaning system using a multitude of forms of energy to help remove pathogens, synthetic chemicals, long dirt chains, as well as other contaminants.

It is another object of the present invention to provide a new and improved system of drying a solute-laden slurry layer applied to the external surface of an item of produce.

It is another object of the present invention to provide a new and improved system of accelerating the drying of a solute-laden slurry layer applied to the external surface of an item of produce.

It is another object of the present invention to provide a new and improved system of forming protective microcrystalline structures on and in the external surface of an item of produce.

SUMMARY OF THE INVENTION

In order to overcome the aforementioned disadvantages associated with drying the produce and achieve many of the aforementioned objects, the present invention, in accordance with one embodiment of the present invention, provides a system of extending the shelf life of produce, comprising:

immersing the produce in a liquid energizing bath;

subjecting the produce to an electrical waveform for a predetermined period of time in a liquid energizing bath, said waveform removing bacteria and pathogens from the surface of the produce;

immersing the produce in a rinse bath;

applying a solute-laden slurry layer to at least a portion of the external surface of the produce;

subjecting the produce to a first drying procedure, wherein at least a portion of the moisture in the solute-laden slurry layer is removed to form a moisture-reduced slurry layer on the produce;

subjecting the produce to a second drying procedure, wherein at least a portion of the moisture in the moisture-reduced slurry layer is removed to form a protective stratum on the produce; and subjecting the produce to a third drying procedure, wherein at least a portion of the moisture in the protective stratum is removed to form a crystalline structure on the produce.

In accordance with another embodiment of the present invention, a second system of extending the shelf life of produce is provided, comprising:

immersing the produce in a liquid energizing bath;

subjecting the produce to an alternating electrical waveform for a predetermined period of time in a liquid energizing bath;

subjecting the produce to an ultrasonic waveform to vibrate the produce for a predetermined period of time in the energizing bath, wherein the combination of the ultrasonic waveform and the electrical waveform creates energy to destroy, decouple, disintegrate and/or neutralize pathogens and other contaminants existing on the produce;

applying a solute-laden slurry layer to at least a portion of the external surface of the produce;

subjecting the produce to a first drying procedure, wherein at least a portion of the moisture in the solute-laden slurry layer is removed to form a moisture-reduced slurry layer on the produce;

subjecting the produce to a second drying procedure, wherein at least a portion of the moisture in the moisture-reduced slurry layer is removed to form a protective stratum on the produce; and subjecting the produce to a third drying procedure, wherein at least a portion of the moisture in the protective stratum is removed to form a crystalline structure on the produce.

In accordance with another embodiment of the present invention, a third system of extending the shelf life of produce is provided, comprising:

subjecting the produce to an ultrasonic waveform to vibrate the produce for a predetermined period of time in the bath;

sweeping the ultrasonic waveform between the first ultrasonic frequency and a second ultrasonic frequency so as to decouple and disintegrate a range of various pathogens and contaminants having different sizes that may exist on the produce;

applying a solute-laden slurry layer to at least a portion of the external surface of the produce;

subjecting the produce to a first drying procedure, wherein at least a portion of the moisture in the solute-laden slurry layer is removed to form a moisture-reduced slurry layer on the produce;

subjecting the produce to a second drying procedure, wherein at least a portion of the moisture in the moisture-reduced slurry layer is removed to form a protective stratum on the produce; and subjecting the produce to a third drying procedure, wherein at least a portion of the moisture in the protective stratum is removed to form a crystalline structure on the produce.

Other features and advantages of the present invention will be become apparent from the following description and appended claims, taken in conjunction with the accompanying Figures.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIGS. 7(a)–7(c) show a pathogen being broken apart by the electromagnetic or mechanical waveforms of the invention to show the process for destroying the pathogen according to the invention;

FIG. 8 is a schematic block diagram identifying the electronics to operate the ultrasonic transducers;

DETAILED DESCRIPTION OF THE PREFERRED EMBODIMENTS

Although the present invention is primarily directed towards a method and apparatus for using electrical and mechanical wave forms to wash produce and a method and apparatus for the accelerated drying of a solute-laden slurry layer on an item of produce, it should be appreciated that the present invention can be practiced with many types of items or objects that require surface washing and drying for any reason whatsoever.

The present invention proposes, among other things, mobile produce cleaning systems and processes that employ, among other things, suitable energy sources to expose the produce to a bioelectrification waveform, or a combination of a bioelectrification waveform and an ultrasonic waveform, in a heated wash bath.

Figure 1:
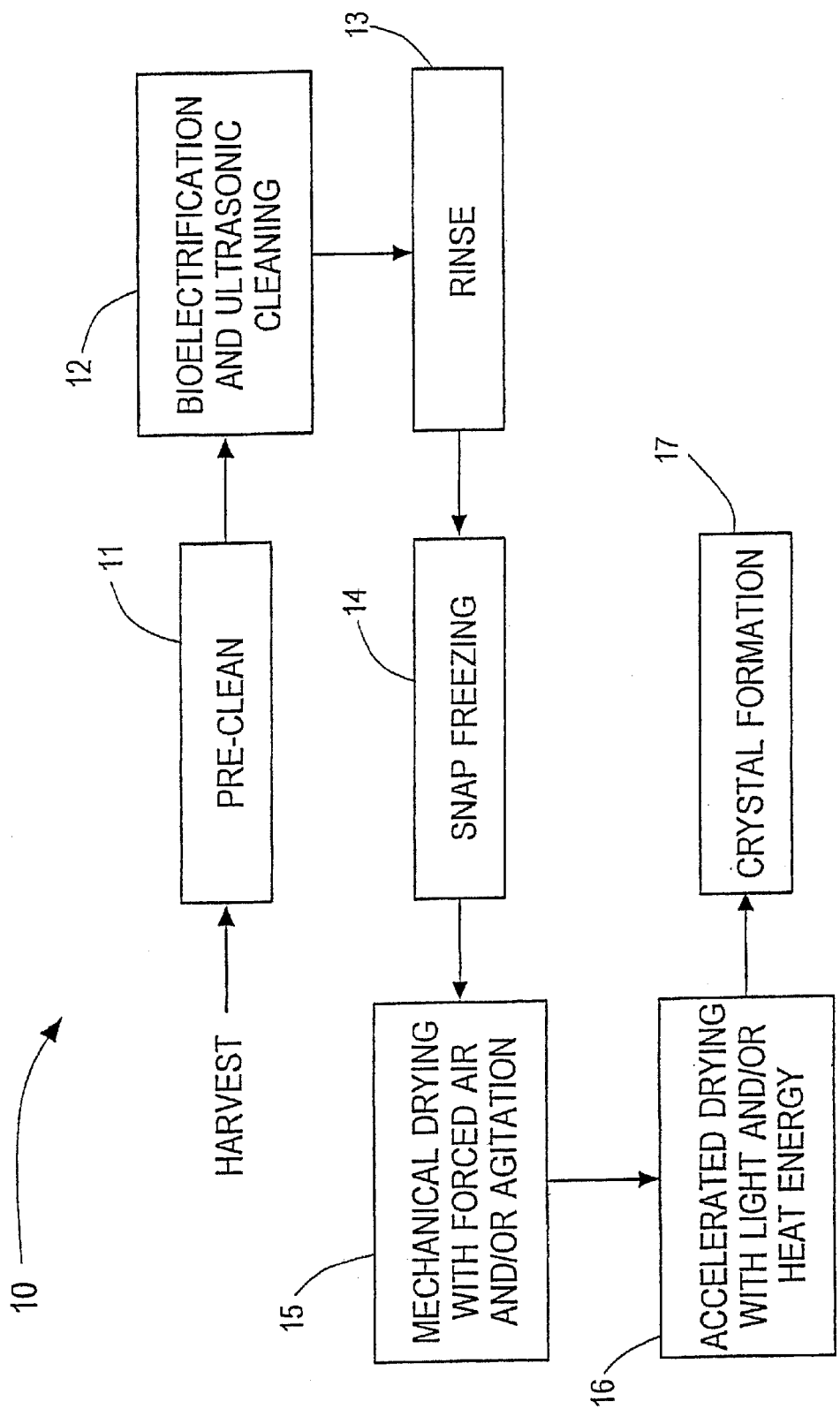
FIG. 1 is a functional block diagram generally showing the primary cleaning and drying steps for extending the shelf life of produce, according to one embodiment of the present invention.

FIG. 1 is a general flow diagram 10 of the primary cleaning steps for the produce, according to one embodiment of the invention. In a first step, recently harvested produce is transported or conveyed to a prewash step at box 11 where dirt, excess foliage, and other larger particulates are removed therefrom. The prewash step 11 may employ any suitable liquid such as water, including a mild detergent suitable for produce cleaning. The prewash liquid may be heated to an elevated temperature, or may be at room temperature.

Next, the produce is sent from the prewash step 11 to an energizing step at box 12 where the produce is exposed to electrical and/or mechanical waveforms. The energizing step 12 includes using suitable electrical energy sources that generate electrical waveforms for removing pathogens and other contaminants from the produce, consistent with the discussion herein. Additionally, ultrasonic transducers are employed in the step 12 to generate mechanical waveforms that also act to remove pathogens from the produce. The energizing step 12 can use any suitable ionic liquid that includes solutes and solvents for promoting electrical conduction through the tank 12, so that the produce is suitably exposed to the radiation. In a preferred embodiment, the liquid used in the energizing step 12 is heated, to further promote the excitation and removal of the various pathogens being effected by the cleaning process. A more detailed discussion of how the electrical and mechanical waveforms are generated and interact with the produce is given below.

The cleaned produce from the step 12 is then conveyed to a stabilization step at box 13 where it is rinsed and temperature stabilized. The stabilization step 13 also employs a water-based liquid, and can also be heated to further promote removal of any excess material that still may exist on the produce. The produce is then ready to be sent to subsequent produce processing steps, such as the snap freeze slurry disclosed in the '152 patent.

The present invention contemplates a continuous conveyor system that sends the produce to the prewash step 11, from the prewash step 11 to the energizing step 12, from the energizing step 12 to the stabilization step 13, and from the stabilization step 13 to the next produce processing stage. The tanks used in the steps 11, 12 and 13 can be of any size suitable for a particular produce and/or volume of produce to be washed. The system can be set up so that the produce is gravity fed from an inlet to the tank to an outlet of the tank. Suitable flow control systems can be provided to cause the produce to move in a desired direction from inlet to outlet, such as in a circular motion around the tank. Of course, the flow control can control the speed of the produce through the washing system so that it is effectively cleaned. Further, specialized filters and the like can be provided to filter the various water-based solutions in the tanks so that pathogens and contaminants removed from the produce are removed from the tanks in a desirable manner.

Figure 2:
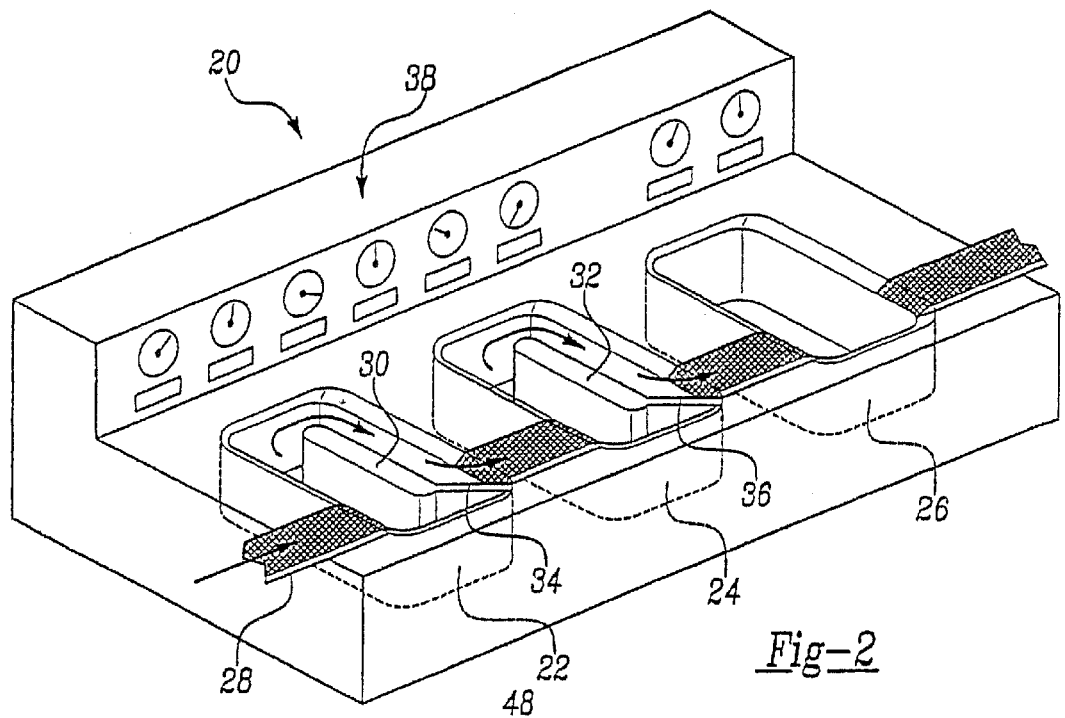
FIG. 2 is a perspective view of a produce cleaning system of the invention showing tanks for the cleaning steps identified in FIG. 1.

FIG. 2 is perspective view of a produce cleaning system 20 for steps 11, 12 and 13 discussed above. The cleaning system 20 includes a preclean tank 22, an energizing tank 24 and a stabilization tank 26, representing each of the cleaning steps 11,12 and 13, respectively. Each tank 22–26 is filled with a liquid based cleaning solution consistent with the discussion herein. A conveyor system 28 directs the produce into the preclean tank 22, and then from the tank 22 to the energizing tank 24, and then on to the stabilization tank 26. Any suitable conveyor system consistent with the discussion herein can be used to move the produce from tank to tank. A flow control system is employed to cause a liquid-based fluid to flow through the tanks 22–26 at a desirable rate suitable for cleaning the produce. The preclean tank 22 includes a center island 30 and the energizing tank 24 includes a center island 32 so that the fluid is caused to flow around the center islands 30 and 32 in a clockwise direction. A barrier 34 is provided in the tank 22 to collect the produce and cause it to enter the next stage of the conveyor system 28. Likewise, a barrier 36 is provided in the energizing tank 24 to collect the cleaned produce and cause it to go into the next stage of the conveyor system 28 to the tank 26. It will be appreciated by those skilled in the art, that this description of the conveying method of the produce is by example, and that other techniques can be employed. A series of controls, gauges and dials 38 monitor the system, and allow an operator to make adjustments to the various parameters of the system 20.

Figure 3:
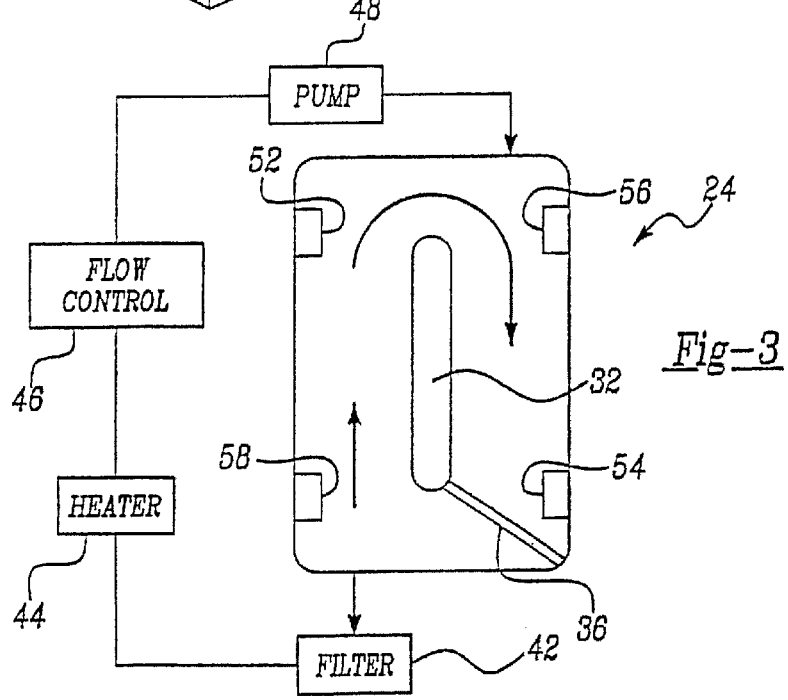
FIG. 3 is a top view of the bioelectrification and ultrasonic cleaning tank of the produce cleaning process of the invention.

FIG. 3 is a top view of the energizing tank 24, according to one embodiment of the present invention. The produce enters the tank 24 from the conveyor system 28. The solution circulates through a flow control system so that the solution in the tank 14, and thus the produce, flow in a clockwise direction around the center island 32. The produce is collected by the conveyor system 28 and sent to the stabilization tank 26. The flow control system includes a filter 42 for filtering out the various contaminants and the like removed from the produce by the cleaning process. Other filtration techniques can be employed as would be apparent to those skilled in the art. A heater 44 heats the fluid in the flow control system to a desirable elevated temperature, for example, 95° F. A flow control 46 includes valves and the like to control the rate of the fluid through the flow control system and the tank 24. A pump 48 pumps the fluid to cause it to flow through the flow control system. A pair of ultrasonic transducers 52 and 54 are positioned diagonally opposed to each other within the tank 24. The transducers 52 and 54 generate the mechanical ultrasonic wave that causes the produce to vibrate, consistent with the discussion herein. Likewise, a pair of electromagnetic energy sources or electrodes 56 and 58 are also positioned within the tank 24 diagonally opposed to each other as shown to conduct a current across the tank 24.

Figure 4:
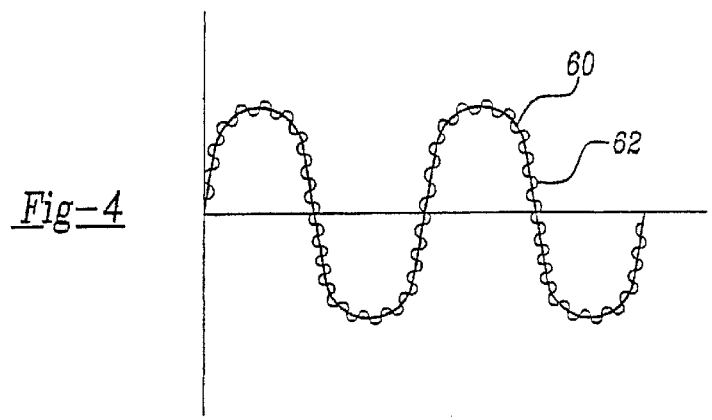
FIG. 4 is an electrical waveform for the bioelectrification energy used to clean the produce according to the invention.

FIG. 4 is an example of the electrical waveform, according to one embodiment, generated by the electrodes 56 and 58 that is used to activate and remove the various pathogens and contaminants on the produce. Preferably, the electrical waveform generated by the electrodes 56 and 58 includes a major carrier wave 60 having an amplitude in the range of 5 volts to 100 volts, with 8 volts to 24 volts being preferred (peak-to-peak). The carrier wave 60 is preferably in the frequency range of 10 Hz to 100 kHz, where the frequency range of 100 Hz to 50 kHz is preferred.

In addition, a much higher frequency sinusoidal modulating wave 62 is imposed upon the carrier wave 60. The higher modulating wave 62 imposed upon the carrier wave 60 is preferably a decade or more higher than the carrier wave 60 in frequency. A complex of higher frequency waves may also be employed. For example, if the carrier wave 60 is operating at 400 Hz (a standard frequency available for many electronic systems), the modulating frequencies may be applied at 4 kHz, 8 kHz, 12 kHz, 16 kHz, 20 kHz up through 40 kHz. Such harmonics are easily obtainable using conventional electronic equipment and signal generators.

Figure 5:
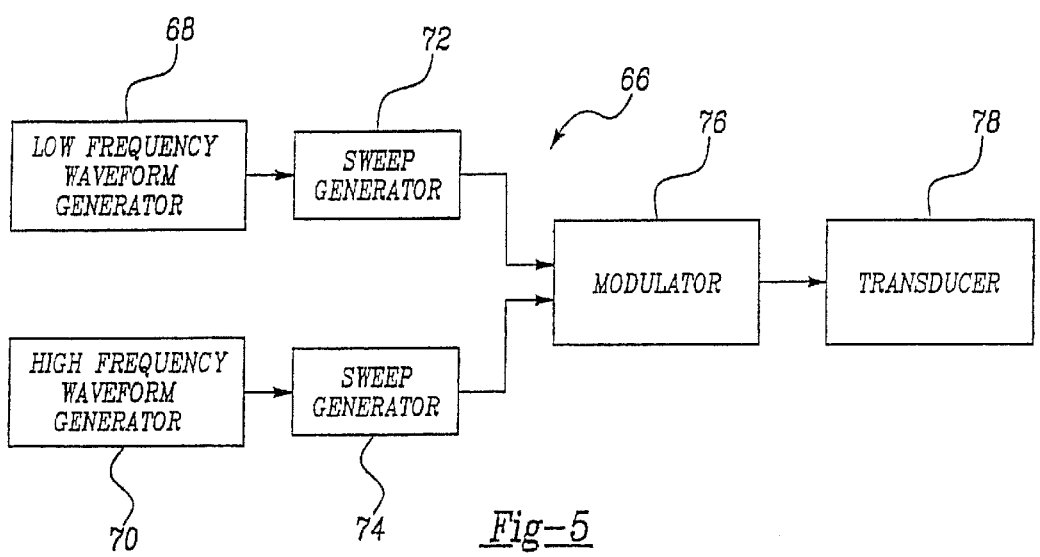
FIG. 5 is a schematic block diagram identifying the electronics used to operate the bioelectrification transducers.

FIG. 5 is schematic block diagram 66 showing the electronics for generating the carrier wave 60 and the modulating wave 62. The block diagram 66 includes a low frequency waveform generator 68 for generating the carrier wave 60, and a high frequency waveform generator 70 for generating the modulating wave 62. A sweep generator 72 receives the carrier wave 60 from the generator 68, and a sweep generator 74 receives the modulating wave 62 from the generator 70. The sweep generator 72 and 74 cause the frequency of the carrier wave 60 and the modulating wave 62 to sweep from one frequency to another frequency within a desirable frequency range so as to affect more of the pathogens and the like on the produce, consistent with the discussion herein. The carrier wave 60 and the modulating wave 62 are then applied to a modulator 76 that modulates the high frequency wave on to the low frequency carrier wave 60. A modulated wave is then applied to a transducer 78 that represents the electrodes 56 and 58.

The carrier wave 60 establishes an electrical current in the solution in the tank 24. The higher frequency modulating wave 62 provides microelectrification of the microscopic structures of the pathogens and other contaminants existing on the produce. This microelectrification causes the various pathogens and the like to be destroyed, decoupled, disintegrated, or otherwise neutralized. The particular frequency of the modulating wave 62 is selected to be in resonance with certain pathogens to provide the best effect. Both the carrier wave 40 and the modulating wave 62 can be swept in frequency, independently of each other or in combination, from a first predetermined frequency to a second predetermined frequency to generate resonant frequencies for the various pathogens and contaminants that may exist on the produce. For example, the carrier wave 60 can be swept in frequency from 10 Hz to 100 kHz, and the modulating wave 62 can be swept from 4 kHz to 200 kHz, depending on the desired pathogens being destroyed, the produce being cleaned, and the relationship of the carrier wave 60 to the modulating wave 62.

The current levels to be achieved in the solution from the electrical waveform is measured in milliamps per square centimeter. A suitable range would be 1 milliamp per square centimeter up to 1,000 milliamps per square centimeter, with amperages in the range of 5 milliamps per square centimeter to 500 milliamps per square centimeter being preferred. The particular current density selected depends in part upon the type of pathogens or other compounds to be cleaned from the produce. For example, some larger structures, including synthetic chemical compounds, such as polychlorinated biphenols and halogenated compounds, may require greater electric field densities to disrupt the pathogens, and thus require a proportionally greater electric field strength or electric current.

The higher frequency modulating wave 62 on the carrier wave 60 essentially causes the electric field to oscillate back and forth as it moves along the surface of the produce, thus causing a microelectrification of the physical objects, including the macro-molecular structures projecting like appendages from the epithelial layer of the produce. These appendages are like cilia or fine hairs which are subjected to mechanical motions moving backwards and forwards, both by the ultrasonic energy and as a result of the electrical energy. In addition, the electric fields are further stratified and tend to flow along the surface of these macro-molecules, thus establishing electrical field gradients and putting mechanical stresses induced by the electrical fields on these appendages, thus in many instances, rupturing the exoskeletal structure of the appendages while leaving the larger epithelial layer intact. Accordingly, these broken exoskeletal structures are thus free to float away in the solution away from the produce.

Figure 6:
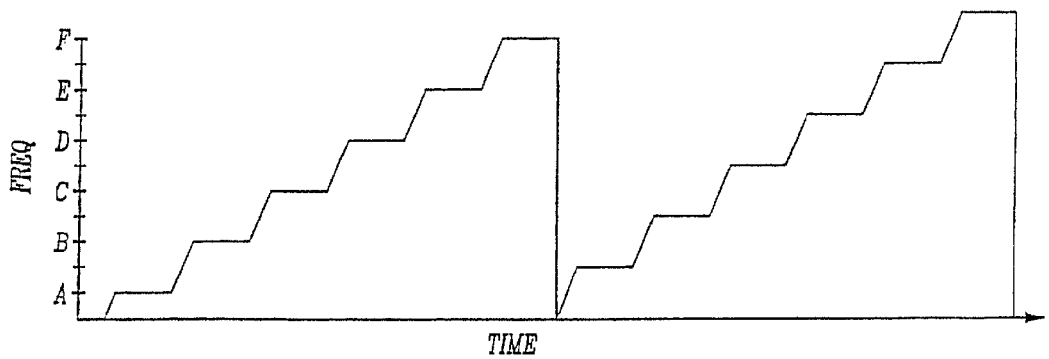
FIG. 6 is a graph with frequency on the vertical axis and time on the horizontal axis showing ramping step function of the electrical waveform of the invention.

FIG. 6 is a graph with frequency on the vertical axis and time on the horizontal axis. The frequency axis is separated into periodic divisions A–F, where each division represents an increase in frequency by a predetermined amount. For example, each division can represent a decade in frequency. The frequency of the electrical energy is ramped up from an initial frequency at the low end of the frequency range at a certain point in time, until it reaches division A. The frequency then stops ramping, and stays at this frequency for a predetermined period of time. This ramping function continues for each division until a certain high end of the frequency range is reached. Each stop at each division represents a particular frequency that the produce is subjected to for a predetermined amount of time to break down and/or destroy the pathogens. The frequency divisions represent resonant frequency for the particular pathogen or part of pathogen. Once the ramping function reaches the top of the frequency range, it returns to the low end of the frequency range and goes through another ramping function. The second ramping function can have frequency steps between the division A–f as shown. The ramping function can be one function, a combination of two ramping functions, or some variation thereof. The particular frequency, time for each division, and overall ramp time, will be determined by the particular produce being cleaned, and the particular pathogens being attacked.

FIGS. 7(a)–7(c) shows a particular pathogen or bacteria 90 that is to be removed or destroyed from the particular produce being cleaned. In FIG. 7(a) the whole pathogen 90 has a certain size and appendages 92. The lower frequency may be selected to attack the pathogen at its initial size, and subsequent higher frequency steps may be used to attack the pieces 92 that break off from the initial pathogen 90 at different resonance frequencies, as shown in FIGS. 7(b) and 7(c).

An important role played by the carrier wave 60 is to establish an initial current through the solution in the tank 24. Those skilled in the art will appreciate that if only a minute electrical field were applied to either end or side of a relatively large tank, there would no current flow through the liquid. The transformation of electrical energy into the solution is accomplished both by the application of the electrical field potential and by the flow of electrical current in the solution. Ultimately, it is best if the electrical current is actually induced in the solution itself, because this electrical current can serve to disrupt cellular structures. For example, a small electrical microcurrent established in a filament-like synthetic chemical structure will in some instances cause that structure to explode, and/or at least detach from the epithelial layer of the produce.

In addition, the precise current levels depend upon the size and geometry's of the fruit or vegetable being cleaned in the tank 24. For example, since the solution is ionic, and thus carries current, the typical circular produce acts as a Faraday cell, having zero potential at its center. The electric currents flowing through the liquid solution in the tank 24 will naturally be impeded by the presence of a round fruit, such as a plum or blueberry, in the solution. Accordingly, as is well known, the higher frequency electrical currents will tend to travel along the skin of the produce as it travels from one point in the tank 24 to another. The electric field is a tenser, represented by a multitude of parallel vectors stretching from one electrode 56 or 58 to the other in the tank 24. The presence of the produce is like a ball in the tenser field, and the lines of electric field force naturally will wrap around this substantially spherical obstruction, causing the concentration of the electrical field on the surface of the produce.

The ionic nature of the solution in the tank 24 is dictated by the components which make up both the solvent (which is preferably water) and the solute and any additives. Preferably, any additives would be entirely natural, and be comprised of primary inorganic salts which form ions in a water based solution. For example, an acidic solution with a pH of less than 7 can be produced by the use of such free agents as hydrochloric acid, sulfuric acid, acetic acid or any other suitable organic acid. In addition, inorganic compounds like sodium chloride, potassium chloride, calcium chloride and/or combinations of the above may be utilized. To form an alkaline bath with a pH above 7, solutes such as calcium hydroxide, sodium hydroxide, potassium hydroxide and others may be used. In addition, organic solutes having an alkaline content including organic sugars, such as fructose, glucose, and sucrose may be employed. Further, synthetic compounds which naturally exhibit either a cationic or anionic signature in a water base solution may also be utilized either alone or in combination with the other above specified substances.

In a preferred process, a compound which normally has an alkaline signature, such as a banana, may be treated in an alkaline based solution, and subjected to ultrasonic energies and electrical energies to disrupt, disable, decouple and/or disintegrate the pathogens and other undesirable contaminants. Such an alkaline environment is well suited to be withstood by the banana which exhibits a natural alkaline surface. The exposure of the banana in such an alkaline environment may be as long as needed in order to induce substantially complete destruction of the pathogens and such.

Similarly, an acidic produce, such as an orange, may be subjected to an acidic tank and subjected to ultrasonic and electrical energies for accomplishing a similar destruction of pathogens and other contaminants.

In this regime of produce cleaning, the tank 24 with its multiple energies, has the beneficial result of antagonistically attacking the pathogens and other contaminants. Those skilled in the art will appreciate that microorganisms tend to propagate in a symbiotic environment. For example, contaminants on bananas are of an organic variety and typically prefer an alkaline environment. Accordingly, another preferred approach to this cleaning process is to expose alkaline-based produce to an acidic environment for a brief period of time so as to not destroy or damage any significant portion of the epithelial layer of the produce required for its long-term preservation until it can be consumed, but yet providing for the substantially complete destruction of pathogens and other organic contaminants which rely upon the alkaline environment for their survival. In particular, the exposure to the acidic environment, coupled with the severe mechanical agitation resulting from the ultrasonic energies, insure a substantially complete exposure of these alkaline-based organic contaminants to the acidic conditions of the solution, thus hastening their destruction and/or disruption or breakdown. The net result is the more efficient cleaning of the produce, while not destroying the natural protective epithelial tissue of the produce.

Similarly, an acidic based produce, such as a lemon or orange, can be temporarily subjected to an alkaline based washing solution, and exposed to electrical and mechanical energies. Such acidic based produce has symbiotic pathogens which exist in acidic environments, and will tend to disintegrate more quickly in the alkaline based solution. Once again, the mechanical agitation induced by the ultrasonic energies will result in the destruction of the pathogens and organic contaminants at a faster rate of speed.

The application of ultrasonic energy by the transducers 52 and 54 to the solution is effective because it tends to put the various appendages or macromolecule chains existing on the produce into a rapid mode of oscillation. This mode of oscillation is the most extreme as the ultrasonic energy frequency nears a resonant frequency for the particular physical structure that the pathogen or organic contaminant represents. For example, if a particular macro-molecule oscillates at 35–40 kHz, an ultrasonic energy of sufficiently high amplitude at that frequency will first result in the decoupling of that macro-molecule from the epithelial layer of the produce, followed by its disintegration as the structure oscillates back and forth so violently that it literally breaks apart. Similarly, smaller structures typically vibrate at higher frequencies, so higher frequency ranges can also be utilized.

FIG. 8 shows a schematic block diagram 82 depicting the electronics used for the transducers 52 and 54. An ultrasonic waveform generator 84 generates the ultrasonic wave introduced into the tank 24. A sweep generator 86 sweeps the ultrasonic frequency within a predetermined range, consistent with the discussion herein. The ultrasonic frequency signal is then sent to a transducer 88 that represents the transducers 52 and 54.

The sweeping of the ultrasonic frequencies can also be ramped in a steplike manner as shown in FIG. 6 to attack various pathogens and the like having different sizes and different resonance frequencies. Of course, the frequencies used would be in the ultrasonic frequency range, and would be selected accordingly.

The electrical energy provided by the electrical waveform that provides the decoupling, fragmentation and disintegration of the various pathogens is a function of the total energy applied to the specific pathogen. The total critical cleaning energy equals the sum of the electric voltage field (with a DC component and an AC component), plus the ultrasonic energy applied to assist the mechanical stress and strain in the structure, plus the chemical solutes, which act at the atomic level to exert decoupling forces upon the covalent and ionic bonds holding the organism together. The velocity of the mechanical turbulence created by the swirling flow of the solution, plus the ionic forms of the solute, again exert a molecular electrical energy to cause a disruption of both existing chemical bonds holding the pathogens and/or contaminants together. This promotes a chemical reaction within the solution to transform the pathogens, either with a strong acidic compound hydrogen ion or a cationic form, so as to totally disrupt and transform the cellular walls and membranes into a harmless form of elemental molecules which have substantially less harmful effect.

Accordingly, for one aspect of the invention, an ultrasonic frequency generator that sweeps from lower frequencies to higher frequencies could be utilized. Multiple sweeps would be provided for the destruction of increasingly smaller particles. For example, a large organic contaminant, such as a e-coli bacteria, may first decouple at 25 kHz, and then may also begin to break apart into smaller pieces. Typically such bacterial structures exist as multi-cell organisms with each cell capable of providing for replication and contamination of a subsequent person who eats the bacteria. Accordingly, it is useful to break up the bacterial chain by first decoupling it from the epithelial layer of the produce, and then individually attacking the cells. The cellular destruction can be assured by first decoupling at a lower frequency, such as 25 kHz, and then hitting it at a higher resonant frequency, such as 30 kHz, to provide for the breakdown of the multi-cell chain into individual chain fragments. Then the produce can be exposed to an even higher frequency, for example 40 kHz, to provide for the breakdown of those cell fragments into individual cells, followed by a higher frequency yet, such as 50, 60, or 70 kHz to cause the vibration and ultimate cell disintegration of the cellular walls of the bacteria. Once the cellular walls of the bacteria are disrupted and their nuclei are released, still higher frequencies on the order of 100 kHz to 200 kHz will result in the disruption of the nuclei into smaller protein fragments which are typically much less harmful than the original bacteria in an individual multi-celled form.

The discussion herein describes a produce cleaning process for destroying, removing and/or incapacitating various pathogens and the like that may exist on the produce. One or more of the combination of the bioelectrification energy, the ultrasonic energy, the chemical solutes in the solution, the swirling flow of the water in the tank 24, and/or the heating of the solution provides this type of produce cleaning.

The present invention also describes systems for drying the produce one it has been cleaned, then preferably rinsed in a rinse bath, and then subjected to the "snap freezing" procedure. One of the benefits of the drying systems of the present invention is that they can be used to kill residual bacteria, fungi, certain types of viruses, and other pathogens that remain on the surface of the produce after the washing and cleaning process has been completed. Alternatively, these microorganisms can be locked harmlessly into the crystal matrix or lattice atop the epithelial tissue of the produce (i.e., the top, outermost, or external layer).

Another benefit of the drying systems of the present invention is that they can be used to cause a quicker mechanical interlocking of the crystals of the crystal matrix into the coarse, pitted (i.e., crater-like) micro-surface of the produce. Basically, the tissue of the produce when viewed at the microscopic level is a series of crevices, fissures and asperities that are used for active osmotic exchange. Such crevices, fissures and asperities are necessary to allow the living plant to breath and exchange nutrients in the air. However, these same crevices, fissures and asperities then become a harbor for various types of microorganisms, especially pathogenic microorganisms. It is necessary to remove these pathogens, and then seal the crevices, fissures and asperities to avoid the re-introduction of the pathogens, in order to eliminate, or at least substantially, reduce the likelihood of infection. This in turn allows the produce, which is generally uncontaminated internally, to remain pristine and pure. It is important to note that food, such as produce, tends to rot from the outside in, as opposed to the inside out, as in the typical spoilage mode.

Additionally, the drying systems of the present invention can tend to produce a non-uniform crystalline growth. In other words, as the moisture is removed in a certain micro-area of the sugar solution, crystallization and polymerization will be initiated. The polymerization site may well be localized to a parent receptor site on the outside of the produce. For example, this crystal nuclei may already exist right at the edge of the crevice. As the crystal growth takes place, the crystals which are growing from these various sites will meet and engage one another, thus producing a more jumbled interlocked three-dimensional less-than-perfect crystal matrix which will have the ability to better interlock to the crevices, fissures and asperities of the epithelial layer, and will have the beneficial result of interlocking different pathogens, such as viruses, bacteria and fungi found in these crevices, fissures and asperities. The other benefit of this growth pattern is that the crystalline structure provides strength to the overall tissue surface, and helps to prevent deflection and bending of the crystalline structure which stabilizes the entire surface.

To the extent that there are subsequent cracks developed in the crystalline structure, the natural moisture exhalation process of the produce will tend to liquefy and re-establish the crystal boundary along the crystalline cracks or fissures.

With reference to FIG. 1, after the produce is washed (at step 12) it is "snap frozen" (at step 14) by being immersed in a cold slurry for a brief predetermined period of time. After the produce is "snap frozen" (at step 14) it is then subject to the drying process. The drying method of the present invention can be characterized by a few basic steps. The first drying step 15 is to remove at least a portion of the excess moisture from the solute-laden slurry layer on the external surface of the produce in order to produce a moisture-reduced slurry layer. Typically, this will be a mechanically performed step which will leave a sufficient slurry layer of solute-laden substances (including sugars, acids, and enzymes) to subsequently form a protective (e.g., sugar) stratum, which will in turn crystallize into an exocrystalline layer (hereinafter referred to as the "ECL"), both of which are discussed herein.

The second drying step 16 is the accelerated in-situ moisture removal of the moisture-reduced slurry layer to create what is referred to as the protective (e.g., sugar) stratum (having some moisture, but less than that of the initial slurry layer) which will ultimately become the ECL when even additional moisture is removed (e.g., evaporated). This accelerated in-situ moisture removal step relies upon the application of energy, such as light (e.g., visible), infrared (IR), ultraviolet (UV)) and/or heat (e.g., thermal energy from various sources such as a heating element, visible light, IR energy, UV energy), to remove still more moisture from the moisture-reduced slurry layer without carrying from the produce the required sugar molecules to eventually form the ECL. The term "stratum" is being used synonymously with the term "strata" because the protective (e.g., sugar) stratum of the present invention can comprise one or more discrete solute-laden layers during the course of the second drying step 16.

The third drying step 17 is the crystal-formation drying stage where the further removal of any remaining moisture in the protective (e.g., sugar) stratum occurs sufficiently slowly enough to allow the formation of crystals within the ECL. Thus, at this point, the external surface of the item of produce is completely, or at least substantially, enveloped by a crystalline structure.

This three step drying method can be performed in the same location, or preferably performed in slightly different locations as the produce is carried or transported from one location to another where suitable equipment is provided to carry out each of the three foregoing steps. Any suitable conveying mechanism, including rollers, rotating tables, fingers, conveyers, helical wires or the like can be employed to accomplish this result. The method can be mechanically driven, pneumatically driven and/or gravity driven. The specific implementation is not believed to be critical to the success of the overall method.

Figure 9A:
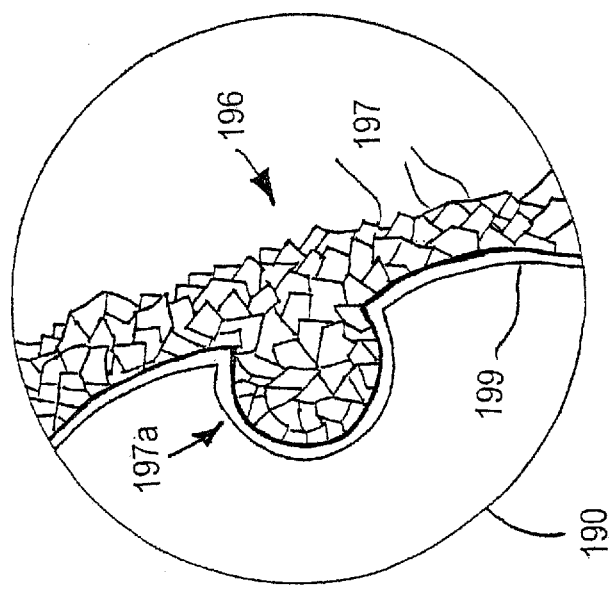
FIG. 9A is a partial cross-sectional view of a detail of the final protective crystalline structure formed on the external surface of the item of produce, in accordance with one aspect of the present invention. In this view, it can be seen that the protective crystalline structure 26 is actually comprised of a plurality of "micro-crystals" 27 which are substantially interlocked together to form a protective layer on the external surface 29 of the item of produce 20, as well as within the cavities formed by pores 29A.
Figure 9:
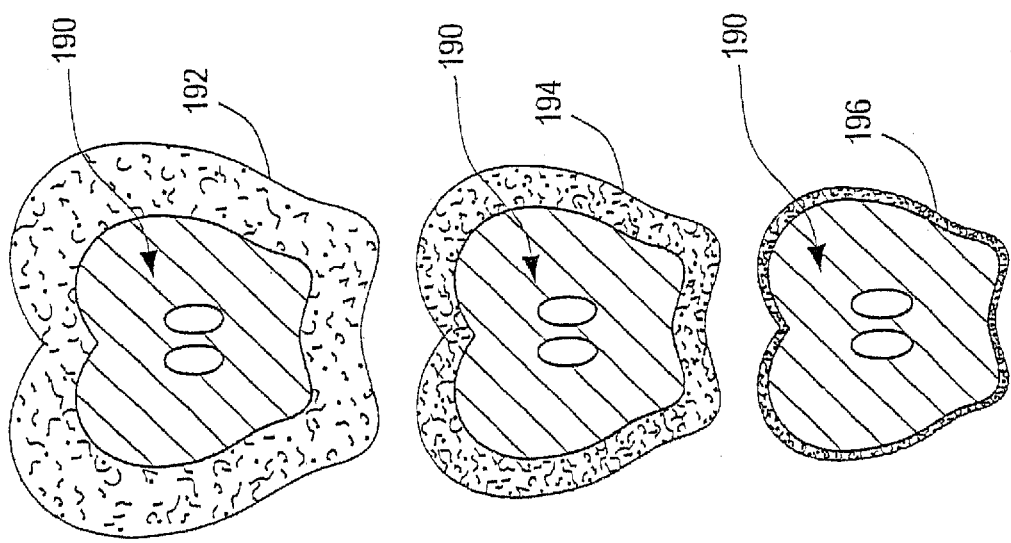
FIG. 9 is a cross-sectional view of an item of produce illustrating the change in appearance and composition of the various solute-laden layers on the external surface of the item of produce after completion of each of the major produce drying steps depicted in FIG. 1, in accordance with one aspect of the present invention.

With reference to FIG. 9, there is shown several cross-sectional views of an item of produce illustrating the change in appearance and composition of the various solute-laden layers on the external surface of the item of produce after completion of each of the major produce drying steps previously discussed. The item of produce 190 (in this case an apple) corresponds to an item of produce that has been subjected to drying step 15 in FIG. 1, i.e., the item of produce 190 has a reduced-moisture slurry layer 192. That same item of produce 190, which has been subjected to drying step 16 in FIG. 1, has a protective (e.g., sugar) stratum 194 with a relatively lower level of moisture (as compared to the moisture-reduced slurry layer 192). Finally, that same item of produce 190, which has been subjected to drying step 17 in FIG. 1, has a crystalline structure 196 (e.g., ECL) with a relatively very low level of moisture (as compared to the protective (e.g., sugar) stratum 194, and especially the moisture-reduced slurry layer 192).

It should be noted that the item of produce 190 did not change appreciably in either shape or dimension during the course of the drying method of the present invention; i.e., it was the solute-laden layers 192, 194, and 196, respectively, that changed in shape and dimension. Accordingly, there should not be any appreciable shrinkage of produce that is processed in accordance with the drying method of the present invention.

With reference to FIG. 9A, there is shown a partial cross-sectional view of a detail of the final protective crystalline structure 196 formed on the external surface of the item of produce, in accordance with one aspect of the present invention. In this view, it can be seen that the protective crystalline structure 196 is actually comprised of a plurality of "micro-crystals" 197 which are substantially interlocked together to form a protective layer on the external surface 199 of the item of produce 190, as well as within the cavities formed by pores 199A.

The individual drying method steps and illustrative apparatuses for carrying out the same will now be described in greater detail. Each of the steps can be used to carry out some of the beneficial killing and/or elimination of the residual pathogens, as will be explained herein.

Figure 10:
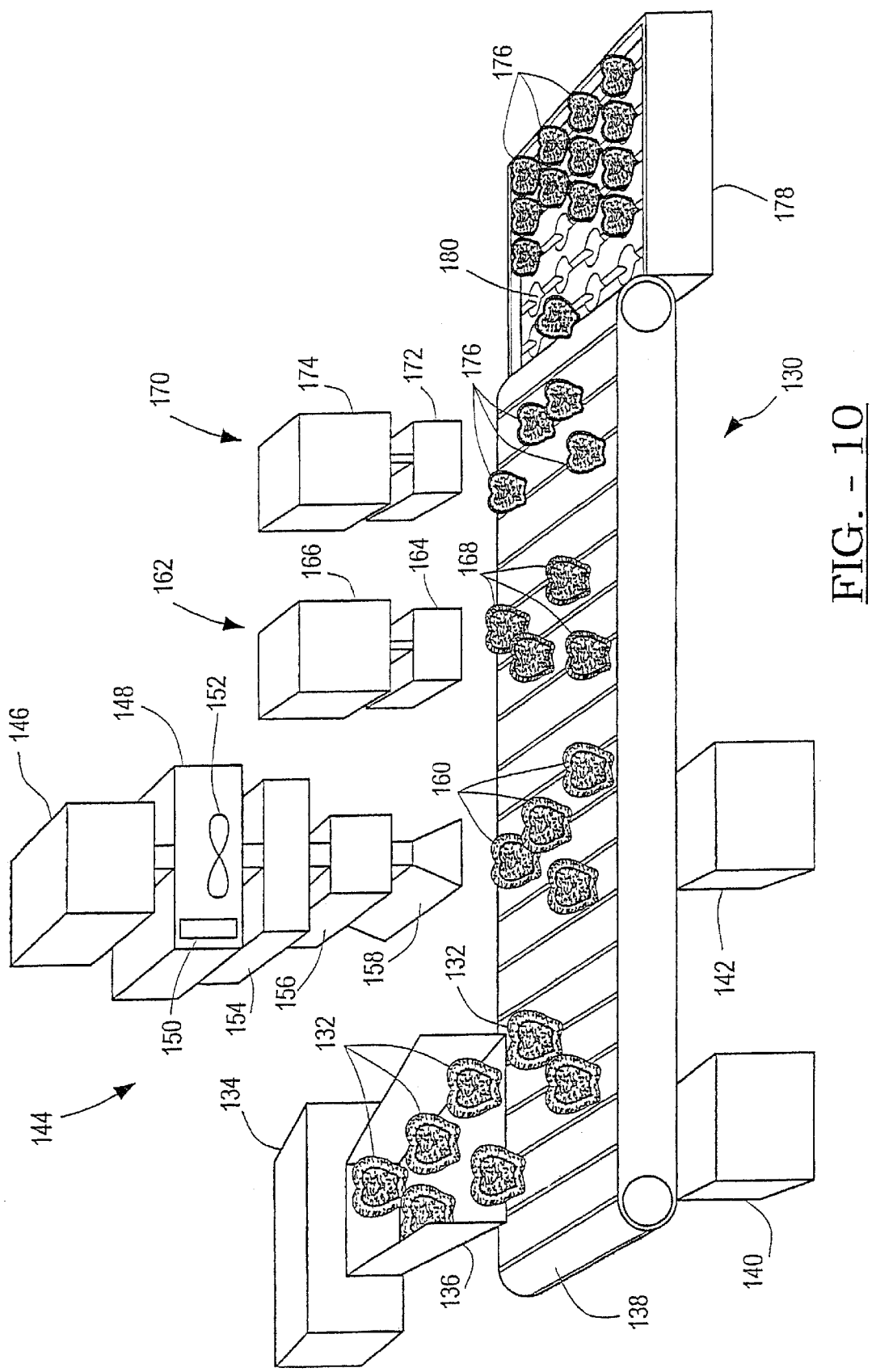
FIG. 10 is a schematic view of a produce drying system, in accordance with one aspect of the present invention.

With reference to FIG. 10, an illustrative apparatus 130 is shown for carrying out the drying method of the present invention. Initially, the produce 132 having a solute-laden slurry layer applied thereto (e.g., in a snap freeze tank 134) is transported to the apparatus 130 of the present invention by any number of conventional ways, such as, but not limited to a slide 136, or a chute, conveyor belt system, and the like.

The produce 132 having a solute-laden slurry layer applied thereto is then deposited onto a suitable transportation device, such as a conveyor belt system 138, which is preferably powered by a motor 140. The conveyor belt system 138 can be controlled by a computer (not shown) in order to control speed, residence time, as well as other operational parameters.

The first step, the removal of excess moisture from the slurry layer, can be accomplished in a variety of ways, preferably with a subsonic air flow (i.e., forced air) and/or mechanical agitation (e.g., controlled shaking or vibration). The key consideration is that a suitable force is applied to the produce in such a manner so as to drive the excess moisture from the slurry layer.

The mechanical agitation can be carried out using an appropriately configured, selectively operable vibration device 142, such as the readily commercially available CYNTRON® vibration system, arranged in a bowl or other suitable configuration. It should be noted that the terms "agitation" and "vibration" are being used synonymously throughout the instant application. Basically, these vibrations devices are motor driven or piezo-electric driven vibrating mechanisms which cause a mass, such as a bolt or screw, to be vibrated and assume an orientation as it moves along or bounces along in a bowl or a track. Such technology can be readily adapted to vibrate produce.

One beneficial use of the mechanical agitation is that all materials, whether alive or inert, have a mass, and every mass has a known harmonic or resonant frequency. When the organisms of a certain size are subjected to mechanical motion in the resonant frequency range and at the right amplitude, the pathogens can literally be shaken to death, i.e., fractured and otherwise broken, thus effectively killing the pathogen or otherwise rendering it harmless. Accordingly, it would be desirable to use a mechanical agitation at a suitable frequency to accomplish such killing of known pathogens. These harmonic frequencies typically will be several orders of amplitude higher than required to put the relatively larger-sized produce (in comparison) into a resonant frequency mode, and thus, there will be no detrimental affect to the epithelial tissue or the internal pulp of the produce.

The subsonic air approach to removing excess moisture preferably employs a selectively operable mechanical air drying unit 144. The individual components of the unit 144 may vary; however, the unit 144 preferably includes an air source 146 (e.g., a pump or compressed air tank), a blower 148 (e.g., a motor 150 and a centrifugal fan 152), a filter 154, a temperature conditioner/control unit 156 (e.g., for providing a desired level of moisture/humidity, as well as for providing heating and/or refrigeration), and a suitably shaped nozzle 158 for providing a flow of air (e.g., laminar) towards the produce 132.

The subsonic air approach to removing excess moisture preferably uses a filtered, clean, temperature-controlled, humidity-controlled, velocity-controlled air stream which is brought across the produce 132 in any particular desired pattern. For example, if the produce is moving along a conveyor, the nozzle 158 can produce a subsonic jet stream which directs relatively high energy air towards the produce 132 sufficient to drive off the excess moisture droplets while leaving a suitable slurry layer on the produce 132 to create the subsequent protective (e.g., sugar) stratum so as to allow for the still subsequent crystal growth. Therefore, it is important that the directed stream of controlled air not drive off all of the moisture, and not drive away the solute-laden slurry extracts which will form the protective (e.g., sugar) stratum from which the moisture is subsequently evaporated to form the ECL.

Preferably, the subsonic air would be humidity-controlled, and at a temperature designed to assist with killing or neutralizing pathogens. This relatively narrow stream or planar layer of air through which the produce 132 passes or which is passed over the produce 132, can be heated (e.g., by the temperature conditioner/control unit 156), so as to temporarily expose those residual pathogens on the outside of the produce 132 to a relatively high temperature momentarily, with a possible result of helping kill or neutralize the pathogens. The subsonic stream of air is preferably in the range of about room temperature to about 500° F., with temperatures in the range of at least about 165° F. and higher being more preferred, with temperatures of at least about 212° F. degrees and higher (at atmospheric pressure) being most preferred because the airborne contaminants will naturally be extinguished and moisture driven out therefrom.

This curtain of air from the nozzle 158 can be any suitable width from the order of a tenth of an inch thick (e.g., for relatively small items of produce) up to several inches (e.g., for relatively large items of produce), as required by the production exposure requirement. Ideally, the exposure time is sufficiently short so as to not raise the temperature of the produce surface above what is nominally acceptable and in accord with U.S. Food and Drug Administration, as well as other domestic and foreign regulatory agency requirements. Such produce surface temperatures are preferably kept below 165° F. and more preferably below 130° F., so as to not cause detrimental or cellular damage from the heat from overabundant transfer to the cell materials. Such detrimental heat transfer would promote tissue degradation and damage and thus reduce shelf life contrary to the goals of the present invention.

The subsonic air can be operated through any suitable pump 148, and run through one or more suitable filters 154. Another way of providing the heat-controlled, pathogen-free air is to draw air off of the outlet side of a heat exchanger (not shown) used to heat water or in other processes associated with the cleaning or washing process. For example, if the drying method of the present invention is used in conjunction with colder than room temperature water or air, the heat exchanger from a refrigeration unit (not shown) can be used as a source of warmed air. If a boiler (not shown) is used as a source of heated water, a suitable air-to-air heat exchanger (not shown), which can include conventional heat transfer structures (not shown) can be used to heat the air above 212° F. for sufficient time to kill airborne pathogens before directing that same air to the produce as part of the mechanical excess moisture removal station.

Although not required, and thus optional, selectively operable visible, infrared and/or ultraviolet light source devices (not shown) can be employed to accomplish the same purpose by accelerated flash drying of the excess moisture, while leaving a suitable protective (e.g., sugar) stratum on the produce surface.

Thus, after completion of the first step by either subsonic air flow and/or mechanical agitation, produce 160 having a moisture-reduced slurry layer is produced.

Figure 11:
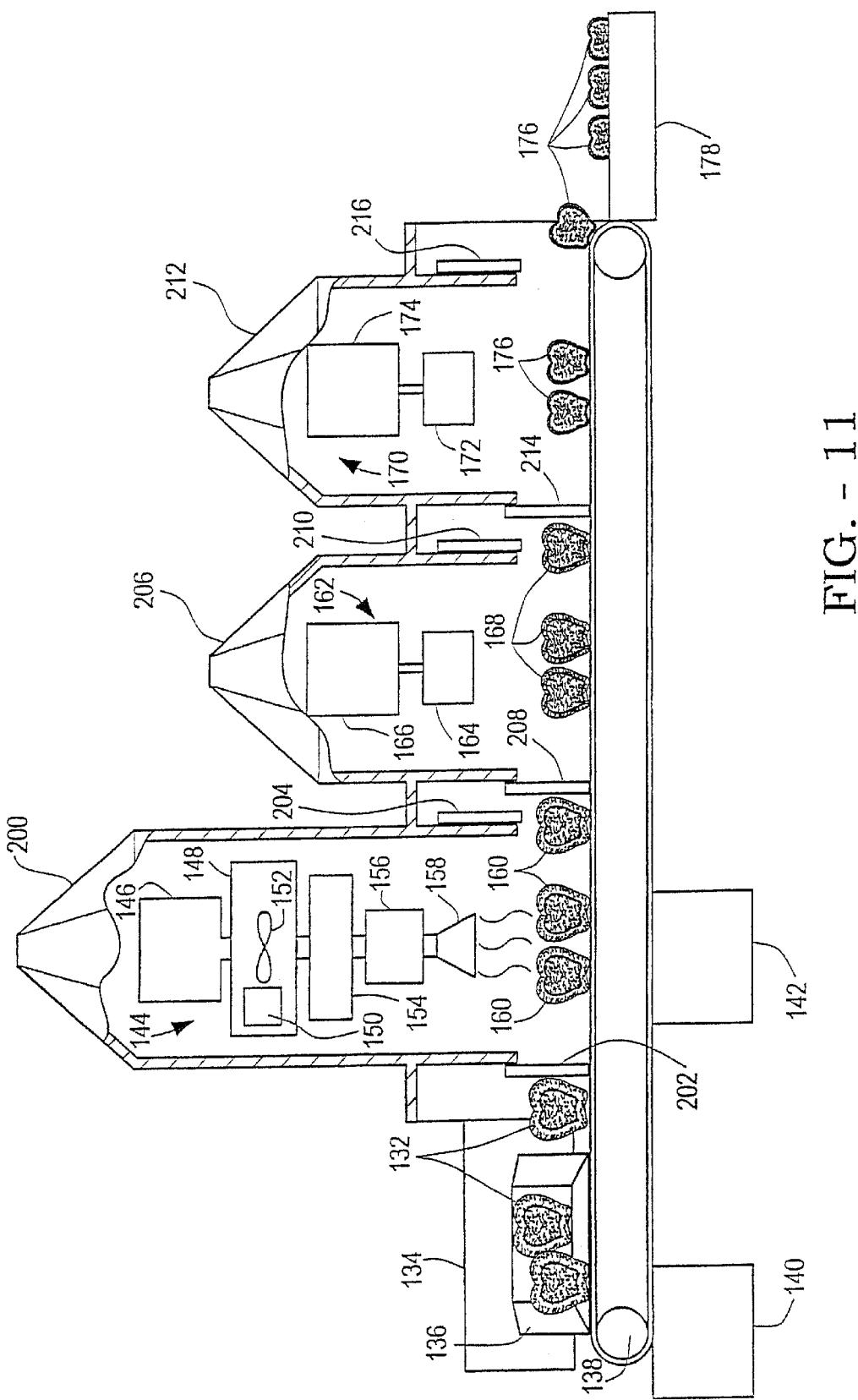
FIG. 11 is a schematic view of an alternative produce drying system, in accordance with one aspect of the present invention.

With reference to FIG. 11, there is shown an alternative embodiment of the invention in that the first step is carried out in an enclosed structure, for example, a hood 200 so as to be better able to control airflow direction and velocity, temperature, humidity, and other operating parameters. The afore-mentioned airflow, agitation, heat/light energy devices, as well as any ancillary equipment, could be housed, either completely or partially, within the hood 200. The hood 200 could extend down completely, or at least substantially, to the surface of the conveyor belt system 138 and could be equipped with an ingress device 202 (e.g., a selectively operable door or passage) for receiving the solute-laden produce 132 and an egress device 204 (e.g., a selectively operable door or passage) for expelling the produce 160 having a moisture-reduced slurry layer in preparation for the second step.

Referring again to FIG. 10, the second step, i.e., the accelerated in-situ moisture removal step, can employ one or more selectively operable light and/or heat energy source devices 162 (preferably including a energy source 164 and a control unit 166) to affect the further removal of moisture from the moisture-reduced slurry layer on the produce 160 to produce the produce 168 having a protective (e.g., sugar) stratum, without mechanically moving the slurry layer/ protective (e.g., sugar) stratum around on the produce surface. In other words, the key part of the drying process is to permit the formation of crystal nuclei upon which the sugars will ultimately crystallize in their multiple crystal patterns thus forming the three-dimensional ECL on the surface of the produce. Initially, the slurry layer has excess moisture which must be driven off while not disturbing too much of the mechanical position of the crystal molecules, or else they not be able to nucleate at the parent receptor site on the apical tissue. Accordingly, this moisture removal step must rely upon the addition of one or more energy sources to cause an increase in Brownian motion and evaporate the excess moisture. This can be done at an accelerated rate using conventional convection oven techniques of moving dry, temperature-controlled air which is passed across the forming protective (e.g., sugar) stratum. Obviously, reduced moisture air levels are preferred, since they accelerate the conversion of liquid water molecules to gaseous water molecules on account of the Brownian motion. Alternatively, or in addition, thermal (i.e., heat) radiation of the IR variety and/or light radiation at visible or ultraviolet levels can be used to heat both the resulting protective (e.g., sugar) stratum and the outermost layers of the tissue so as to increase the overall temperature level of the protective (e.g., sugar) stratum and promote the nucleation of sugar crystals as well as drive out excess moisture while not moving the protective (e.g., sugar) stratum. At the technical level, $H_2O$ is the solvent while the sugar slurries are the solute, and the drying process results in the concentration of the solute in the liquid solvent, ultimately resulting in the dry crystal structures growing outwardly from the nucleation sites, which resemble rock candy in appearance. The thermal (i.e., heat) and/or visible light or UV energy which is used, is preferably selected to be in a range designed not to produce detrimental tissue transformations, including DNA breakages and/or other degradations, including macromolecular damage or damage to organelles. The light can be provided at a steady amplitude, or can be pulsed. Wave forms of differing types can be used and energy levels at different types can be used. All of the exposure should be calculated not to produce the above-noted damaging effects. It is important to note that the exposure of infrared and/or ultraviolet light energies to the residual pathogens still resident in the protective (e.g., sugar) stratum will beneficially result in their destruction and/or neutralization by breakage. However, the more advanced life forms, namely the produce structures themselves, particularly since they are typically designed by nature to resist damage from light sources, including UV radiation, will not be harmed as long at the concentrations of infrared, visible and/or ultraviolet energies are not too great.

It is expected that for different varieties of produce, such as strawberries, peppers, tomatoes and apples, different levels of energy can be desirable in terms of creating the desired accelerated drying time. For example, more hearty produce, such as apples or peppers may be able to be exposed to larger doses of energy at a greater range of frequencies than more delicate vegetation such as strawberries or broccoli.

It is important to note that non-ionizing energy sources are used. In this regard, the UV exposure should be controlled. For example, UVB radiation is at a higher frequency than UVA radiation and the radiation frequencies can be selected to control the depth of penetration of the radiation dependent upon how hearty the epithelial layer of produce tissue is to damage from such sources. For example, shucked corn could be processed this way and have its life extended. However, because corn normally grows inside the husk it is not as resistant to UV damage as an item of produce such as an apple or a pepper, which is normally bathed in sunlight which includes UV radiation on a regular basis and obviously is designed to withstand such radiation without harmful effects.

Referring again to FIG. 11, there is shown an alternative embodiment of the invention in that the second step can be carried out in an enclosed hood 206 so as to be better able to control various operating parameters, such as temperature and light levels. The afore-mentioned heat/light energy devices, as well as any ancillary equipment, could be housed within the hood 206. The hood 206 could extend completely, or at least substantially, down to the surface of the conveyor belt system 138 and could be equipped with an ingress device 208 (e.g., a selectively operable door or passage) for receiving the produce 160 and an egress device 210 (e.g., a selectively operable door or passage) for expelling the produce 168 having a protective (e.g., sugar) stratum in preparation for the third step.

Referring again to FIG. 10, the third step, i.e., the crystal-formation drying step, can employ one or more selectively operable light and/or heat energy source devices 170 (preferably including a energy source 172 and a control unit 174) to affect the further removal of moisture from the protective (e.g., sugar) stratum on the produce 168 to produce the produce 176 having a crystalline structure.

The crystal-formation drying stage will typically be conducted slower than the accelerated in-situ moisture removal step because most of the moisture is now gone from the protective (e.g., sugar) stratum, and the final mechanical motions of the sugar crystals are taking place and are not susceptible to accelerated processing, but instead takes a little bit of time measured from a few seconds up to a few minutes or longer. This step can also be called the stabilization of the protective (e.g., sugar) stratum. It represents the conclusion of the removal of the solvent from the solute, including the removal of moisture from the interstices between adjacent growing crystals, so as to allow the crystal formations to grow together and thus interlock in the three-dimensional ECL on the external surface of the produce 176. The step locks the crystals into the epidermal layer of the skin, because the individual micro-crystals now grow into an overall structure which spans the width and/or the length of the crevice, fissure or asperity in the skin of the produce 176. Also, the growth of the crystal relies on the molecular alignment of the polar molecules into the precise orientation required by the individual single-crystal lattices being formed. Crystalline structures typically rely upon ionic and covalent bonding and assume a pre-defined form dictated by the specific substances which are effectively precipitated out of their solution and arrive in a pre-crystalline form. The micro-crystalline structure which is formed is allowed to expand as the solvent evaporates, and the micro-crystalline structures become interconnected forming a macro-crystal lattice at a three-dimensional level which is locked into the crevices, fissures and asperities of the skin of the produce 176. The sugars during this stage go from a sticky or tacky state to a dry to the touch state. Although some moisture can remain and evaporate later, the produce 176, with its sugar crystal coating known as the ECL is now sufficiently dried to allow for packaging. Packaging can be done using any suitable technique, including by hand. Preferably, such packaging will be done by a worker having a glove so that the natural floral, fauna and chemicals (e.g., oils) present on the human hand are not allowed to transfer to or contact the crystalline structure. Instead, the produce can be packed into previously clean and/or sterile containers 178 with suitable packaging materials 180 including tissue, papers and other media.

The energy levels used to accomplish this final drying step are typically less than in the second step. Additionally, this drying step is not so vigorous as to disrupt the cohesion environment that is being created for the protective (e.g., sugar) stratum and the produce. Preferably, the solute-laden slurry which becomes the protective (e.g., sugar) stratum and then becomes the crystalline structure (i.e., ECL) is composed of the same sugars which exist naturally in the produce. Thus, there is a cohesive bonding, rather than simple adhesion, between the localized sugar molecules present in the epithelial layer and the solute-laden stratum. Thus, under the final drying step, the drying is sufficiently slow and non-vigorous so as to allow the micro-crystalline structures developing in the protective (e.g., sugar) stratum to chemically interlock by adhesion to similar crystalline structures found on the (microscopic) surface of the epithelial tissue of the produce. Accordingly, the bond between the produce and the protective (e.g., sugar) stratum is not merely adhesion, but in fact there is a chemical interlock between the naturally-present sugars and other components (including enzyme structures), and the protective (e.g., sugar) stratum. Additionally, it is important to note that the solute-laden slurry is made from these same produce components, so that bonding also occurs quite naturally at suitable temperatures and moisture conditions between the protein molecules in the solute-laden slurry and the protein molecules in the epithelial layer of the produce. Produce, when heated to suitable temperatures automatically exhibits self-healing characteristics and the cellular structures, being unable to distinguish between themselves and the slurry compounds which genetically mirror their own DNA structures, find themselves engaging in mutually beneficial co-existence and intercellular preservation functions. In otherwords, even after produce is picked or harvested, the cells of the epithelial layer are engaged in a survival regime to allow them to exist as long as their energy sources allow.

In this crystal formation step, the energy applied should be sufficient to allow the sugars to go from their sticky or tacky state to a dry to the touch state, while not allowing for degeneration of the tissue levels. The energy source can be heat, light, or any other type of energy from a suitable selectively operable energy source device that permits the removal of moisture from the protective (e.g., sugar) stratum and the proper formation of the crystalline structure. Preferably, the heat ranges will be less than 140° F. and preferably less than 120° F. for most types of produce. For those types of produce used to higher temperatures, they can be exposed to higher process temperatures. For example, an eggplant has a purplish black surface and absorbs a substantial amount of light. Thus, its cellular structure is designed to withstand greater amounts of heat than might be withstood by a strawberry or a peach which typically grows best in shaded conditions. Thus, the highest allowable process temperatures are determined in part by the ability of the particular variety or species of produce to withstand heat or other severe weather conditions.

Referring again to FIG. 11, there is shown an alternative embodiment of the invention in that the third step can be carried out in an enclosed hood 212 so as to be better able to control various operating parameters, such as temperature and light levels. The afore-mentioned heat/light energy devices, as well as any ancillary equipment, could be housed within the hood 212. The hood 212 could extend completely, or at least substantially, down to the surface of the conveyor belt system 138 and could be equipped with an ingress device 214 (e.g., a selectively operable door or passage) for receiving the produce 168 and an egress device 216 (e.g., a selectively operable door or passage) for expelling the produce 176 having a crystalline structure in preparation for packaging.

The components for cleaning, rinsing, snap-freezing, and drying the produce are intended to be mobile, in that they can be easily transported to a field, assembled (along with any auxiliary equipment such as harvesting equipment, sorting equipment, conveyor belts, handling equipment, packaging equipment, and the like), put immediately into operation, and then disassembled for transportation to another site.

The mobile ability of the various embodiments of the apparatus of the present invention ensures that the harvested produce will be quickly and efficiently protected from pathogens. By having the apparatus of the present invention in the field as the produce is harvested, great savings can be realized to various agricultural business sectors. For example, it will no longer be necessary to use highly capital-intensive, centralized processing centers to process produce. As a result, it will no longer be necessary to maintain a large fleet of trucks or railroad cars in order to transport the produce to the processing plant. Finally, because trucks and railroad cars are no longer needed in any great number, significant monetary savings can be realized by reducing fuel expenditures.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of extending the shelf life of produce, by reducing pathogen populations on the surface of the produce through the use of an applied electric waveform, and by sealing at least a portion of the surface of the produce by applying a slurry layer to at least a portion of the produce and drying the produce in an accelerated manner, without significantly reducing the moisture content inside of the produce, in order to form a film including crystalline structures on the produce, that helps protect the produce against deterioration, the method comprising:

immersing at least a portion of the produce in a liquid energizing bath;

subjecting the portion of the produce immersed in the liquid energizing bath to an electrical waveform for a predetermined period of time in a liquid energizing bath, said waveform removing at least some portions of the pathogens from the surface of the produce;

immersing at least a portion of the produce in a rinse bath to assist in removing pathogens from the immersed surface of the produce;

applying a solute-laden slurry layer to at least a portion of the surface of the produce from which at least some of the pathogens have been removed;

subjecting the produce to a first accelerated drying procedure, wherein at least a portion of the moisture in the solute-laden slurry layer is removed to form a moisture-reduced slurry layer on the produce;

subjecting the produce to a second accelerated drying procedure including the application of at least a first form of energy other than moving air, wherein at least a portion of the moisture in the moisture-reduced slurry layer is removed to form a protective stratum on the produce; and subjecting the produce to a third accelerated drying procedure different from the second accelerated drying procedure, wherein at least a portion of the moisture in the protective stratum is removed to form a film including crystalline structures on the produce.

2. The method according to claim 1, wherein the step of subjecting the produce to the electrical waveform includes subjecting the produce to an alternating electrical waveform that includes a fundamental carrier wave and a higher frequency wave imposed on the carrier wave.

3. The method according to claim 2, wherein the step of subjecting the produce to the electrical waveform includes generating the carrier wave at a current sufficient enough to establish an electric current in the energizing bath and generating the higher frequency wave at a frequency sufficient to provide microelectrification of at least some of the pathogens on the surface of the produce.

4. The method according to claim 1, wherein the step of subjecting the produce to the electrical waveform includes sweeping the electrical waveform from a first predetermined frequency to a second predetermined frequency at least twice the first predetermined frequency.

5. The method according to claim 4, wherein the step of sweeping the electric waveform from the first predetermined frequency to the second predetermined frequency includes ramping up the frequency of the electrical waveform in a step like manner through a first series of at least four successive steps where each step in the first series is at a higher frequency than a previous step in the first series and wherein the frequency of the waveform is maintained at each such step for a predetermined period of time.

6. The method according to claim 2, wherein the carrier wave has a frequency in the range of 10 Hz to 100 kHz and an electrical current in the range of 1 milliamp per square centimeter to 1,000 milliamps per square centimeter in the bath.

7. The method according to claim 1, further comprising the step of subjecting the produce to an ultrasonic waveform to vibrate the produce for a predetermined period of time in the energizing bath.

8. The method according to claim 7, wherein the step of subjecting the produce to an ultrasonic waveform includes sweeping the ultrasonic waveform between a first predetermined ultrasonic frequency and a second predetermined ultrasonic frequency at least twice the first predetermined frequency.

9. The method according to claim 8, wherein the step of sweeping the ultrasonic waveform between the first frequency to the second frequency includes ramping up the ultrasonic waveform in a step like manner through a first series of at least four successive steps where each step in the first series is at a higher frequency than a previous step in the first series and is maintained at each such step for a predetermined period of time.

10. The method according to claim 1, wherein the step of immersing the produce in an energizing bath includes immersing the produce in a heated energizing bath.

11. The method according to claim 10, wherein the step of immersing the produce in an energizing bath includes immersing the produce in an energizing bath heated to about 95° F.

12. The method according to claim 1, wherein the step of immersing the produce in an energizing bath includes immersing the produce in a water based ionizing bath.

13. The method according to claim 12, wherein the step of immersing the produce in the ionizing bath includes immersing the produce in a bath including dissolved salts.

14. The method according to claim 1, wherein the step of immersing the produce in an energizing bath includes immersing the produce in an acid bath having a pH less than 7.

15. The method according to claim 1, wherein the step of immersing the produce in an energizing bath includes immersing the produce in an alkaline bath having a pH greater than 7.

16. The method according to claim 1, wherein the first drying procedure includes applying a stream of air to the produce.

17. The method according to claim 16, wherein the stream of air has a temperature in the range of about room temperature to about 500° F.

18. The method according to claim 1, wherein the first accelerated drying procedure includes applying a vibratory force to the produce.

19. The method according to claim 1, wherein the second accelerated drying procedure includes applying light energy to the produce.

20. The method according to claim 1, wherein the second accelerated drying procedure includes applying heat energy to the produce.

21. The method according to claim 1, wherein the third accelerated drying procedure includes applying light energy to the produce.

22. The method according to claim 1, wherein the third accelerated drying procedure includes applying heat energy to the produce.

23. A method of extending the shelf life of produce, by reducing pathogen populations on the surface of the produce through the use of applied electric and ultrasonic waveforms, and by thereafter sealing at least a portion of the surface of the produce by applying a slurry layer to at least a portion of the produce and drying the produce in an accelerated manner, without significantly reducing the moisture content inside of the produce, in order to form a film including crystalline structures on the produce, that helps protect the produce against deterioration, the method comprising:

immersing the produce in a liquid energizing bath;

subjecting the produce to an alternating electrical waveform for a predetermined period of time in the liquid energizing bath;

subjecting the produce to an ultrasonic waveform to vibrate the produce for a predetermined period of time in the energizing bath, wherein the combination of the ultrasonic waveform and the electrical waveform applies sufficient energy to decouple and neutralize pathogens and other contaminants existing on the produce;

applying a solute-laden slurry layer to at least a portion of the external surface of the produce;

subjecting the produce to a first accelerated drying procedure, wherein at least a portion of the moisture in the solute-laden slurry layer is removed to form a moisture reduced slurry layer on the produce;

subjecting the produce to a second accelerated drying procedure including at least a first form of energy other than mechanically-applied energy, wherein at least a portion of the moisture in the moisture-reduced slurry layer is removed to form a protective stratum on the produce; and subjecting the produce to a third accelerated drying procedure different from the second accelerated drying procedure and including a second form of energy other than mechanically-applied energy, wherein at least a portion of the moisture in the protective stratum is removed to form a film including microcrystalline structures on the produce.

24. The method according to claim 23, wherein the step of subjecting the produce to the electrical waveform includes subjecting the produce to an alternating electrical waveform that includes a fundamental carrier wave and a higher frequency wave imposed on the carrier wave.

25. The method according to claim 24, wherein the step of subjecting the produce to the electrical waveform includes generating the carrier wave at a current sufficient enough to establish an electric current in the energizing bath and generating a higher frequency wave that has a frequency sufficient to provide microelectrification of bacteria and other pathogens on the surface of the produce.

26. The method according to claim 23, wherein the step of subjecting the produce to the electrical waveform includes sweeping the electrical waveform from a first predetermined frequency to a second predetermined frequency at least twice as high as the first predetermined frequency.

27. The method according to claim 26, wherein the step of sweeping the electric waveforms from the first predetermined frequency to the second predetermined frequency includes ramping the electrical waveform in a step like manner through a first series of at least four steps where each successive step in the first series is at a higher frequency than the previous step in the first series and is maintained at each such step for a predetermined period of time.

28. The method according to claim 24, wherein the carrier wave has a frequency in the range of 10 Hz to 100 kHz and an electrical current in the range of 1 milliamp per square centimeter to 1,000 milliamps per square centimeter in the bath.

29. The method according to claim 23, wherein the step of subjecting the produce to an ultrasonic waveform includes sweeping the ultrasonic waveform between a first ultrasonic frequency and a second ultrasonic frequency at least twice the first predetermined frequency.

30. The method according to claim 29, wherein the step of sweeping the ultrasonic waveform from the first ultrasonic frequency to the second ultrasonic frequency includes ramping up the ultrasonic waveform in a step like manner through a first series of at least four successive steps where each successive step in the first series is at a higher frequency than a previous step in the first series and is maintained at each such step for a predetermined period of time.

31. The method according to claim 23, wherein the step of immersing the produce in an energizing bath includes immersing the produce in a heated energizing bath.

32. The method according to claim 23, wherein in the step of immersing the produce in an energizing bath includes immersing the produce in an energizing bath heated to about 95° F.

33. The method according to claim 23, wherein the step of immersing the produce in an energizing bath includes immersing the produce in a water based ionizing bath.

34. The method according to claim 33, wherein the step of immersing the produce in the ionizing bath includes immersing the produce in a bath including dissolved salts.

35. The method according to claim 33, wherein the step of immersing the produce in an energizing bath includes immersing the produce in an acid bath having a pH less than 7.

36. The method according to claim 33, wherein the step of immersing the produce in an energizing bath includes immersing the produce in an alkaline bath having a pH greater than 7.

37. The method according to claim 33, wherein the first drying procedure includes applying a stream of air to the produce.

38. The method according to claim 37, wherein the stream of air has a temperature in the range of about room temperature to about 500° F.

39. The method according to claim 33, wherein the first accelerated drying procedure includes applying a vibratory force to the produce.

40. The method according to claim 33, wherein the first accelerated drying procedure includes applying a stream of air and a vibratory force to the produce.

41. The method according to claim 33, wherein the second accelerated drying procedure includes applying light energy to the produce.

42. The method according to claim 33, wherein the second accelerated drying procedure includes applying heat energy to the produce.

43. The method according to claim 33, wherein the third accelerated drying procedure includes applying light energy to the produce.

44. The method according to claim 33, wherein the third accelerated drying procedure includes applying heat energy to the produce.

45. A method of extending the shelf life of produce, by reducing pathogen populations on the surface of the produce through the use of an applied ultrasonic waveform, and by sealing at least a portion of the surface of the produce by applying a slurry layer to at least a portion of the produce and drying the produce in an accelerated manner, without significantly reducing the moisture content inside of the produce, in order to form a film including crystalline structures on the produce, that helps protect the produce against deterioration, comprising:

- subjecting the produce to an ultrasonic waveform to vibrate, for a predetermined period of time in the bath, various pathogens and contaminants having different sizes that may exist on the produce;
- sweeping the ultrasonic waveform between the first ultrasonic frequency and a second ultrasonic frequency that is at least twice the first ultrasonic frequency so as to decouple and disintegrate a range of the various pathogens and contaminants having different sizes that may exist on the produce in order to clean the produce;
- applying a solute-laden slurry layer to at least a portion of the external surface of the produce cleaned by use of the ultrasonic waveform;
- subjecting the produce to a first accelerated drying procedure, wherein at least a portion of the moisture in the solute-laden slurry layer is removed to form a moisture-reduced slurry layer on the produce;
- subjecting the produce to a second accelerated drying procedure including the application of at least a first form of energy other than moving air, wherein at least a portion of the moisture in the moisture-reduced slurry layer is removed to form a protective stratum on the produce; and
- subjecting the produce to a third accelerated drying procedure different from the second accelerated drying procedure, wherein at least a portion of the moisture in the protective stratum is removed to form a crystalline structure on the produce.

46. The method according to claim 45, wherein the step of sweeping the ultrasonic waveform from the first frequency to the second frequency includes ramping up the ultrasonic waveform in a step like manner in a first series of at least four steps where each step in the first series is at a higher frequency than a previous step in the first series and is maintained at each such step for a predetermined period of time.

47. The method according to claim 45, wherein the step of immersing the produce in an energizing bath includes immersing the produce in a heated energizing bath.

48. The method according to claim 47, wherein in the step of immersing the produce in an energizing bath includes immersing the produce in an energizing bath heated to about 95° F.

49. The method according to claim 45, wherein the step of immersing the produce in an energizing bath includes immersing the produce in a water based ionizing bath.

50. The method according to claim 49, wherein the step of immersing the produce in the ionizing bath includes immersing the produce in a bath including dissolved salts.

51. The method according to claim 45, wherein the step of immersing the produce in an energizing bath includes immersing the produce in an acid bath having a pH less than 7.

52. The method according to claim 45, wherein the step of immersing the produce in an energizing bath includes immersing the produce in an alkaline bath having a pH greater than 7.

53. The method according to claim 45, wherein the first drying procedure includes applying a stream of air to the produce.

54. The method according to claim 53, wherein the stream of air has a temperature in the range of about room temperature to about 500° F.

55. The method according to claim 45, wherein the first drying procedure includes applying a vibratory force to the produce.

56. The method according to claim 45, wherein the first drying procedure includes applying a stream of air and a vibratory force to the produce.

57. The method according to claim 45, wherein the energy of the second drying procedure is selected from the group consisting of light, heat, and combinations thereof.

58. The method according to claim 45, wherein the energy of the third drying procedure is selected from the group consisting of light, heat, and combinations thereof.

* * * * *